(12) United States Patent
Fukushima

(10) Patent No.: US 8,416,440 B2
(45) Date of Patent: Apr. 9, 2013

(54) FACSIMILE APPARATUS, AND CONTROL METHOD AND STORAGE MEDIUM THEREFOR

(75) Inventor: Michio Fukushima, Yokohama (JP)

(73) Assignee: Canon Kabushiki Kaisha (JP)

( * ) Notice: Subject to any disclaimer, the term of this patent is extended or adjusted under 35 U.S.C. 154(b) by 824 days.

(21) Appl. No.: 12/557,018

(22) Filed: Sep. 10, 2009

(65) Prior Publication Data

US 2010/0073719 A1 Mar. 25, 2010

(30) Foreign Application Priority Data

Sep. 24, 2008 (JP) .................... 2008-244939

(51) Int. Cl.
*H04N 1/60* (2006.01)
(52) U.S. Cl.
USPC .......................... 358/1.15; 358/1.1
(58) Field of Classification Search ............ 358/1.1, 358/1.15
See application file for complete search history.

(56) References Cited

FOREIGN PATENT DOCUMENTS

| JP | 56008985 | A | | 1/1981 |
| JP | 59205853 | A | | 11/1984 |
| JP | 59216346 | A | | 12/1984 |
| JP | 06-085990 | | * | 3/1994 |
| JP | 06-085990 | A | | 3/1994 |

OTHER PUBLICATIONS

English translation of JP 06-085990, Mar. 25, 1994.*
Japanese Office Action issued in counterpart application No. JP2008-244939, dated May 7, 2012.

* cited by examiner

*Primary Examiner* — King Poon
*Assistant Examiner* — Iriana Cruz
(74) *Attorney, Agent, or Firm* — Rossi, Kimms & McDowell LLP

(57) ABSTRACT

A mechanism for reserving a line for use in facsimile transmission before issuance of a user's instruction to execute facsimile transmission is provided. To accomplish this, when a user has initiated settings for facsimile transmission (step S601), a line that is in the "open" state is reserved with reference to a line-use status table (step S603). Then, upon receipt of a user's instruction to execute facsimile transmission (step S605), the reserved line is acquired and facsimile data is transmitted using the acquired line (step S606).

14 Claims, 16 Drawing Sheets

FACSIMILE APPARATUS, AND CONTROL METHOD AND STORAGE MEDIUM THEREFOR

BACKGROUND OF THE INVENTION

1. Field of the Invention

The present invention relates to a facsimile apparatus that executes facsimile communications over a line, a control method, and a storage medium for controlling the same.

2. Description of the Related Art

One conventionally known method for transmitting image data by facsimile is, after receipt of a user's instruction to execute facsimile transmission, to read an original and accumulate generated image data once into a memory and then, after completing the reading of all pages of the original, to acquire a line. Such a transmission method is called memory transmission.

Another well-known method is, after receipt of a user's instruction to execute facsimile transmission, to acquire a line in advance so as to establish communications with a facsimile apparatus that is the destination of transmission before initiating the reading of an original, and then to sequentially transmit image data simultaneously with the operation of reading an original. Such a transmission method is called direct transmission.

Now, in the case where a user transmits facsimile data by means of either memory or direct transmission as described above, another user's instruction may in some cases initiate the use of a line while the former user is inputting settings for the execution of facsimile transmission. In such a case, a problem arises in that the user who completed inputting the settings for the execution of facsimile transmission cannot initiate the execution of facsimile transmission soon and has to wait until the end of the line use according to another user's instruction.

In particular, in the case of direct transmission as described above, the reading of an original also cannot be initiated until the end of the line use according to another user's instruction, that is, the reading will be initiated only after the line is available, which reduces operating efficiency.

Note that the "settings for the execution of facsimile transmission" as used herein refers to, for example, the selection of a destination, the placement of an original, specification of transmission parameters (such as resolution and read size), and so on. The "use of a line according another user's instruction" refers to, for example, cases such as facsimile transmission according to another user's instruction or timer transmission of facsimile data that has been previously stored in a memory along with transmission-time information.

Another conceivable case is that a user's instruction to execute facsimile transmission may be issued from an external apparatus that is connected to a facsimile apparatus over a network, instead of the user operating the facsimile apparatus itself to issue an instruction to execute facsimile transmission. In such a case, a user who operates an external apparatus has difficulty in knowing in real time whether or not the line of the facsimile apparatus is currently busy and thus suffers the inconvenience of knowing that the line is busy for the first time when he or she has issued an instruction to execute facsimile transmission.

In addition, the possibility of the above problem occurring increases if a single facsimile apparatus is connected to a plurality of external apparatuses, in which case facsimile transmission is executed according to an instruction from each external apparatus. In other words, the problem is more serious in the above environment because when a user using a certain external apparatus has issued an instruction to execute facsimile transmission, the line is more likely to be busy with another user's instruction from another external apparatus.

On the other hand, a conventional technique as described in the following Japanese Patent Laid-Open No. 06-085990 that is intended to allocate a line for use in facsimile communications has been known.

Japanese Patent Laid-Open No. 06-085990 discloses a technique for line control by defining which use status, "open," "reserved," or "busy," each communication line has. Japanese Patent Laid-Open No. 06-085990 is intended to prevent all lines from being used for facsimile transmission and to thereby avoid a situation where there remains no line that can be used for facsimile reception; it enables the interruption of the use of a line upon an incoming call by keeping a line in a "reserved" state for a predetermined period of time before transmission.

Japanese Patent Laid-Open No. 06-085990 described above is, however, only intended to allocate a line for use in facsimile reception and not intended to allocate a line for use in facsimile transmission.

In addition, according to the technique described in Japanese Patent Laid-Open No. 06-085990, the "reserved" state for a predetermined period of time is provided only after a user has issued an instruction to execute facsimile transmission. Thus, if before the issuance of a user's instruction to execute facsimile transmission, another user's instruction has initiated the use of a line, there still remains the problem that the user has to wait until the end of the line use according to another user's instruction.

SUMMARY OF THE INVENTION

The present invention enables realization of a mechanism for reserving a line for use in facsimile transmission before the issuance of a user's instruction to execute facsimile transmission.

One aspect of the present invention provides a facsimile apparatus that executes facsimile communications over a line, comprising: a reservation unit that reserves a line to be used for facsimile transmission before execution of the facsimile transmission; and a transmission unit that, after the reservation unit has reserved a line, acquires the reserved line upon a user's instruction to execute the facsimile transmission, and transmits facsimile data using the acquired line, wherein the reservation unit reserves the line when direct transmission is selected as a transmission method for transmitting the facsimile data.

Another aspect of the present invention provides a method for controlling a facsimile apparatus that executes facsimile communications over a line, comprising: reserving a line to be used for facsimile transmission before execution of the facsimile transmission; and after reserving the line, acquiring the reserved line upon receipt of a user's instruction to execute facsimile transmission and transmitting facsimile data using the acquired line, wherein the reservation of the line is performed when direct transmission is selected as a transmission method for transmitting the facsimile data.

Further features of the present invention will become apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Exemplary Embodiment

System Configuration

Figure 1:
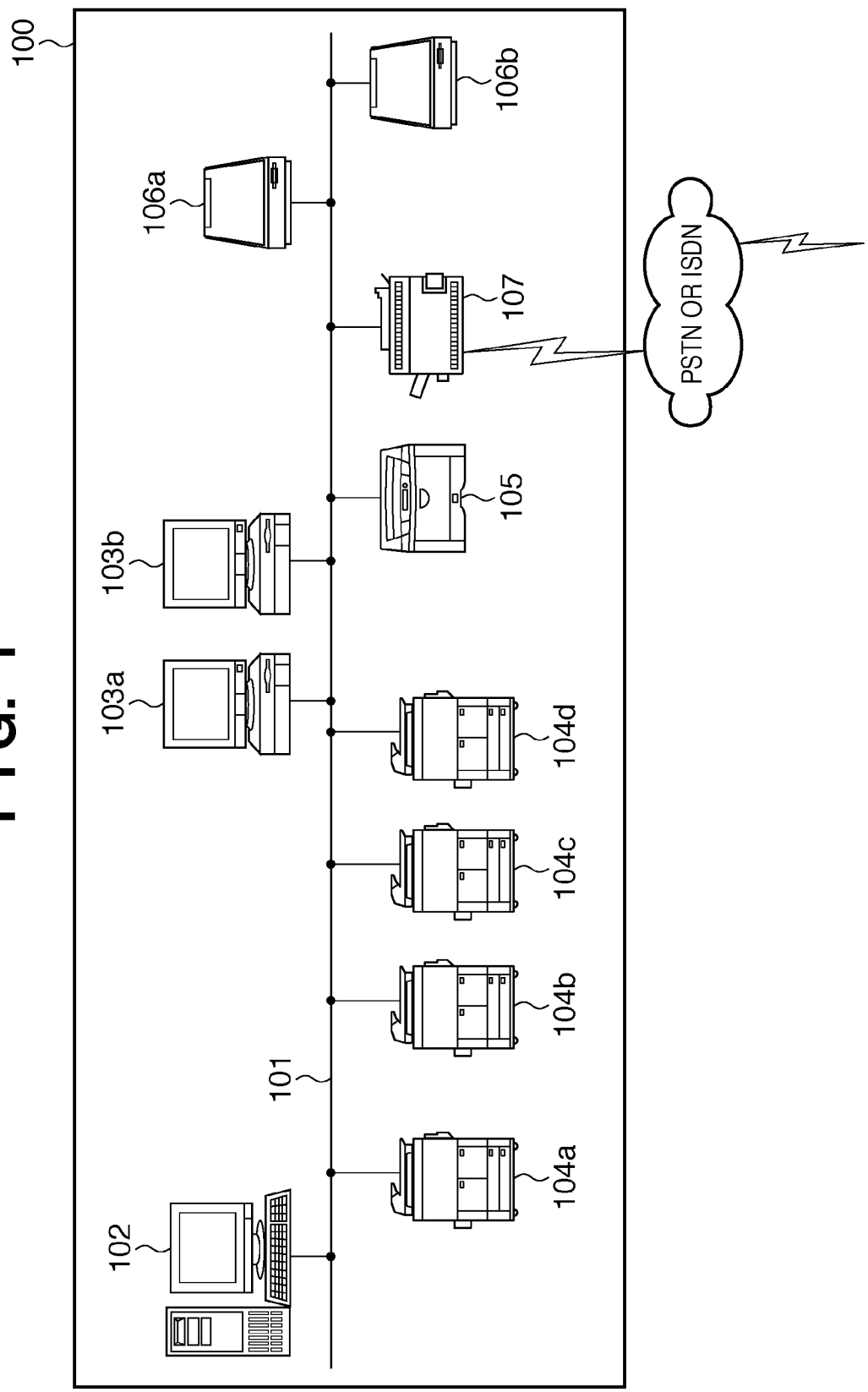
FIG. 1 illustrates an outline of a facsimile system according to a first exemplary embodiment.

Hereinafter, a first exemplary embodiment is described with reference to FIGS. 1 to 6. FIG. 1 illustrates an outline of a facsimile system according to the first exemplary embodiment.

The facsimile system 100 includes a server computer (hereinafter referred to as a "server") 102 and client computers (hereinafter referred to as "clients") 103a and 103b. The facsimile system 100 further includes a facsimile apparatus 107, MFPs 104a, 104b, 104c, and 104d, an LBP 105, and scanners 106a and 106b. As illustrated in FIG. 1, each apparatus is connected over a network 101. Note that MFP is an abbreviation for a "multifunction peripheral." Also, LBP is an abbreviation for a "laser beam printer."

The MFPs 104a, 104b, 104c, and 104d are capable of executing processing such as full-color scanning and printing. The LBP 105 is capable of executing a color printing process. The number of apparatuses in the facsimile system 100 is not limited to the number shown in FIG. 1; for example, more clients other than the clients 103a and 103b may be connected in the system.

The facsimile apparatus 107, the MFPs 104a, 104b, 104c, and 104d, and the LBP 105 are each connected so as to be capable of exchanging information through the server 102, the clients 103a and 103b and the network 101. Specifically, the mechanism is such that information regarding or the states of the MFPs 104a, 104b, 104c, and 104d and the LBP 105 are shared among the server 102 and the clients 103a and 103b or among the facsimile apparatus 107, the MFPs 104a, 104b, 104c, and 104d, and the LBP 105. The facsimile apparatus 107 has the function of receiving image data from the MFPs 104a, 104b, 104c, and 104d, the server 102, and the clients 103a and 103b, converting the received image data into facsimile data, and transmitting the data by facsimile over a line.

Configuration of Facsimile Apparatus

Figure 2:
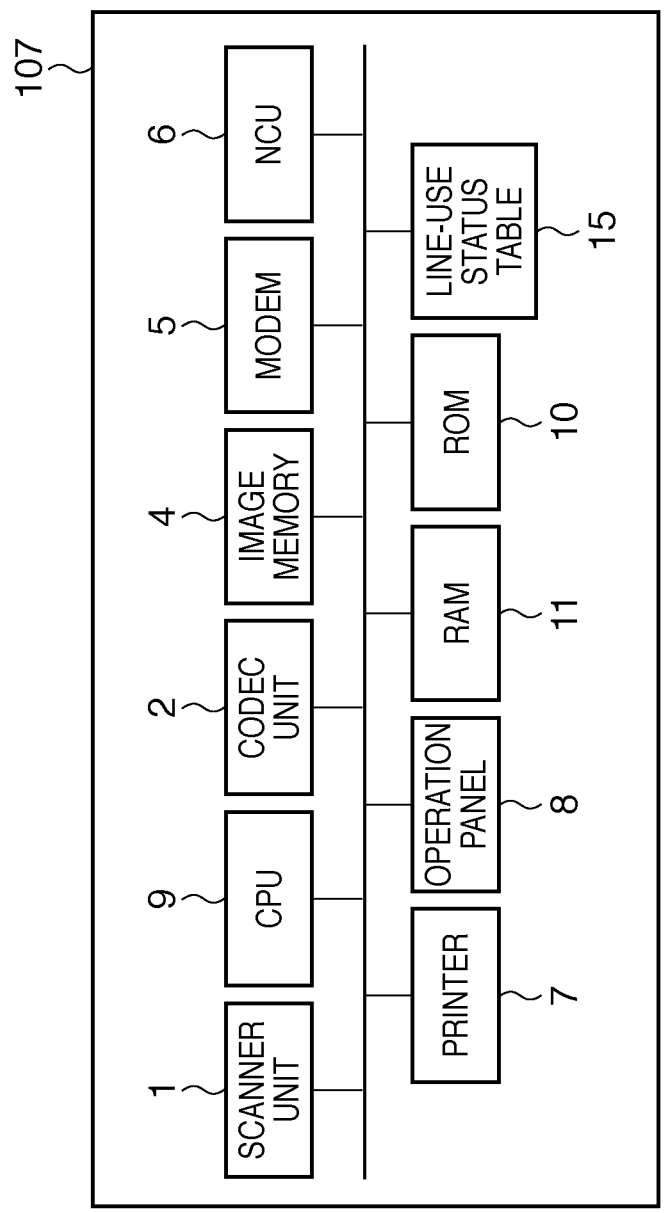
FIG. 2 is a block diagram illustrating an exemplary configuration of a facsimile apparatus according to the first exemplary embodiment.

Next, the facsimile apparatus 107 will be described with reference to FIG. 2. FIG. 2 is a block diagram illustrating an exemplary configuration of a facsimile apparatus according to the first exemplary embodiment. Note that blocks that are relevant to the present invention are primarily described below. Thus, the configuration of the facsimile apparatus 107 may include any other block.

The facsimile apparatus 107 includes a scanner unit 1, a CPU 9, a CODEC unit 2, an image memory 4, a modem 5, an NCU 6, a printer 7, an operation panel (operation unit) 8, a RAM 11, a ROM 10, and a line-use status table 15. The scanner unit 1 reads an image on an original and converts the image into image data in the form of an electric signal. The CODEC unit 2 encodes image data or decodes encoded image data. The image memory 4 accumulates encoded image data. The modem 5 modulates image data to be transmitted or demodulates received image data. The line control unit (NCU) 6 acquires a line upon receipt of a user's instruction to execute facsimile transmission, and calls up a party at the other end by automatic dialing or makes an arrangement for communications in accordance with a predetermined facsimile protocol. Note that the following description is given on the assumption that the facsimile apparatus 107 according to the present exemplary embodiment has a total of four lines, namely a single ISDN line and three PSTN lines.

The printer 7 forms an image on sheets (recording material) based on received image data. The operation panel 8 includes a numeric keypad, function keys, and a display unit, for example. The system control unit (CPU) 9 exercises control over the entire facsimile operation. The ROM 10 stores a control program for actuating the facsimile system, and other master data, for example. The RAM 11 serves as a work area or stores a variety of data for transmission reservations or for relay broadcasting, for which data settings have been set by a user with the operation panel 8.

Figure 3:
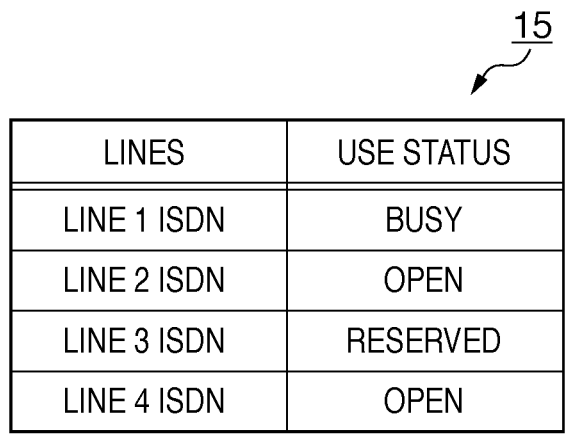
FIG. 3 illustrates the contents of the definition of a line-use status table according to the first exemplary embodiment.

Now, the line-use status table 15 will be described with reference to FIG. 3. FIG. 3 illustrates the contents of the definition of a line-use status table according to the first exemplary embodiment. As illustrated in FIG. 3, the line-use status table 15 stores information (use status) indicating which state, "busy," "reserved," or "open," each of a plurality of lines is in, those line being connectable to the facsimile apparatus 107.

The use status includes "busy", "reserved", and "open". The term "busy" indicates that the line is currently being used for either transmission or reception.

The term "reserved" indicates that the line is not used in fact, but it has been allocated as a line for use in facsimile transmission by an instruction from a specific user (or a specific apparatus). Where a line is in the "reserved" state, a user (or apparatus) different from the user (or apparatus) who reserved the line cannot use that line.

The term "open" indicates that the line is in neither the "busy" nor "reserved" state, that is, any user (or apparatus) can use that line.

In the facsimile apparatus 107 according to the present exemplary embodiment, image data that has been read from the scanner unit 1 is encoded by the CODEC unit 2 and temporarily accumulated in the image memory 4. The image data is then read out from the image memory 4, modulated by the modem 5, and transmitted to the NCU 6.

On the other hand, in the case of reception, image data that has been received via the NCU 6 is demodulated by the modem 5 and then temporarily stored in the image memory 4. Subsequently, the image data is transmitted to and decoded by the CODEC unit 2. The decoded image data is transmitted to the printer 7 at which the image data is printed and output on sheets.

Configuration of MFP

Figure 4:
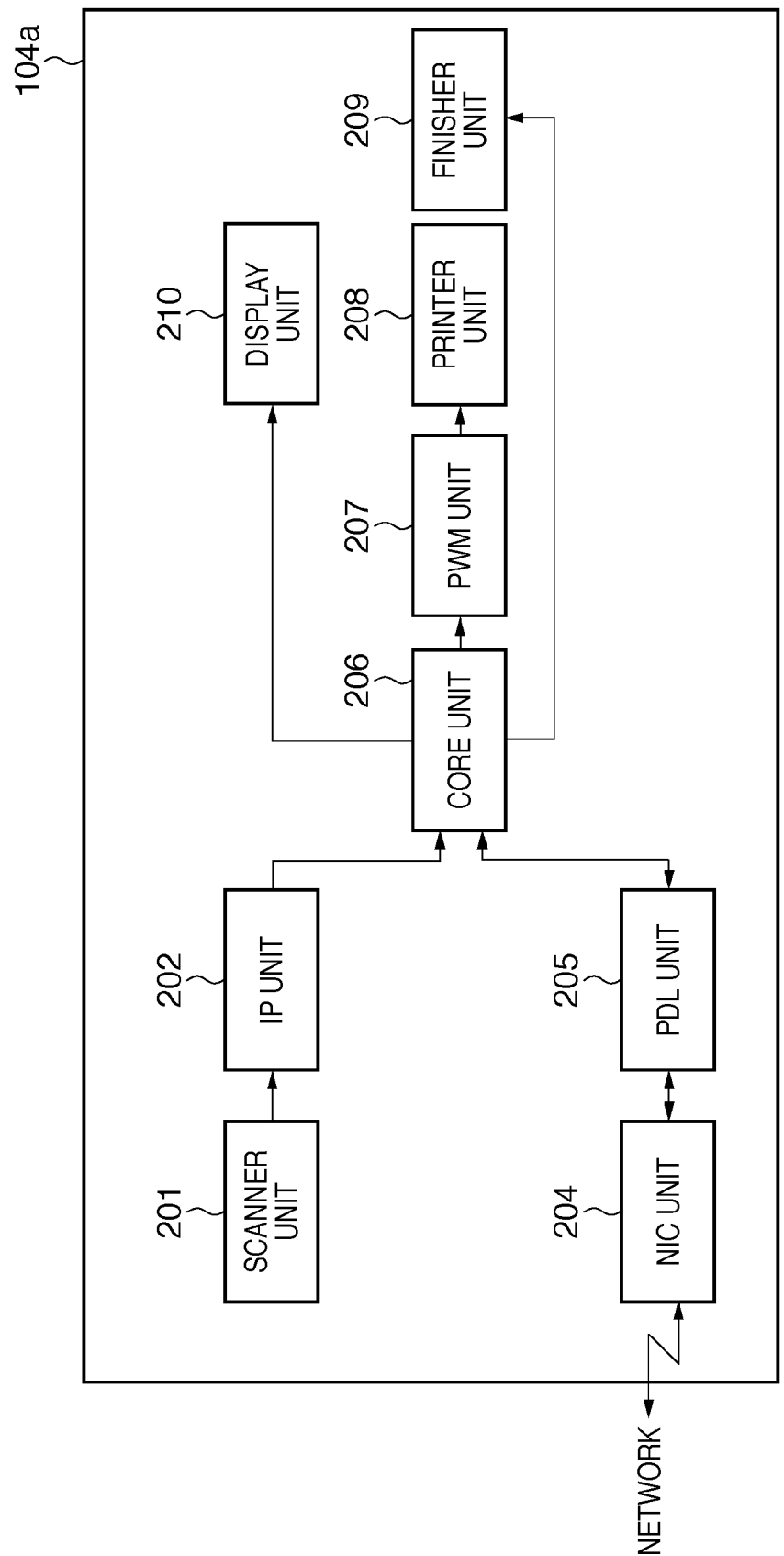
FIG. 4 is a block diagram illustrating an exemplary configuration of an MFP according to the first exemplary embodiment.

Next, the configurations of the MFPs 104a to 104d will be described with reference to FIG. 4. FIG. 4 is a block diagram illustrating an exemplary configuration of the MFP 104a according to the first exemplary embodiment. Note that the blocks that are relevant to the present invention are primarily described below. Thus, the configuration of the MFP 104a may include any other block. The MFPs 104b, 104c, and 104d are similar in configuration to the MFP 104a, so a description thereof is omitted herein.

The MFP 104a includes a scanner unit 201, an IP unit 202, an NIC unit 204, a PDL unit 205, a core unit 206, a PWM unit 207, a printer unit 208, a finisher unit 209, and a display unit 210. The scanner unit 201 reads an image on an original to generate image data. The IP unit 202 performs image processing on the image data that has been output from the scanner unit 201. The NIC (Network Interface Card) unit 204 exchanges image data or device information about external apparatuses over a network. The PDL unit 205 expands the page description language (PDL) transmitted from the client 103a or 103b into an image signal, for example. The core unit 206 temporarily stores an image signal depending on the use of the MFP 104a or determines a path for transmission.

The image data that has been output from the core unit 206 is transmitted to the printer unit 208 that forms an image. A sheet with an image formed by the printer unit 208 is transmitted to the finisher unit 209 where the sheet is subjected to sorting or finishing. The display unit 210 is configured to include an input device for entering an instruction as to MFP operations such as scanning or copying by the MFP 104a. The display unit 210 is also used to check the content of an image without printing the image or to preview the appearance of an image before printing.

Configuration of Scanner Unit

Figure 5:
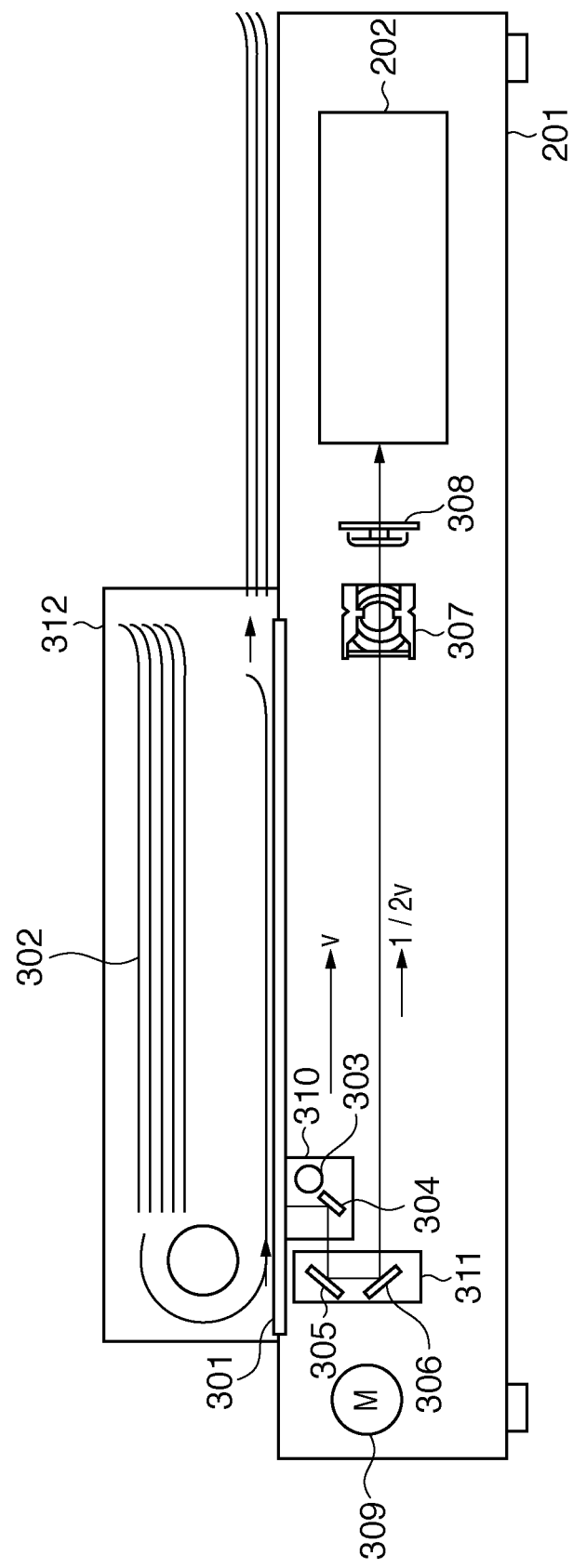
FIG. 5 illustrates an exemplary configuration of a scanner unit according to the first exemplary embodiment.

Next, the configuration of the scanner unit 201 of the MFP 104a illustrated in FIG. 4 will be described with reference to FIG. 5. FIG. 5 illustrates an exemplary configuration of a scanner unit according to the first exemplary embodiment.

The scanner unit 201 includes an original glass plate 301, a lens 307, a CCD 308, a motor 309, and mirror units 310 and 311. The mirror unit 310 includes a lighting lamp 303 and a mirror 304. The mirror unit 311 includes mirrors 305 and 306.

An original 302 to be read is placed on the original glass plate 301. The original 302 is irradiated by the illuminating lamp 303 and the reflected light there from is reflected off the mirrors 304, 305, and 306 and is focused on the CCD 308 through the lens 307. The mirror unit 310 moves at a velocity of v, whereas the mirror unit 311 moves at a velocity of ½ v. With the above operation, the entire surface of the original 302 is scanned. The mirror units 310 and 311 are driven by the motor 309.

Reference numeral 312 denotes an automatic document feeder. The automatic document feeder 312 sends a plurality of sheets of originals that are stacked one above another to the original glass plate 301 and, after completing the reading of each original, ejects the original from the original glass plate 301. It further moves the next original to be read onto the original glass plate 301. These operations enable a plurality of sheets of originals to be read in succession.

Figure 6:
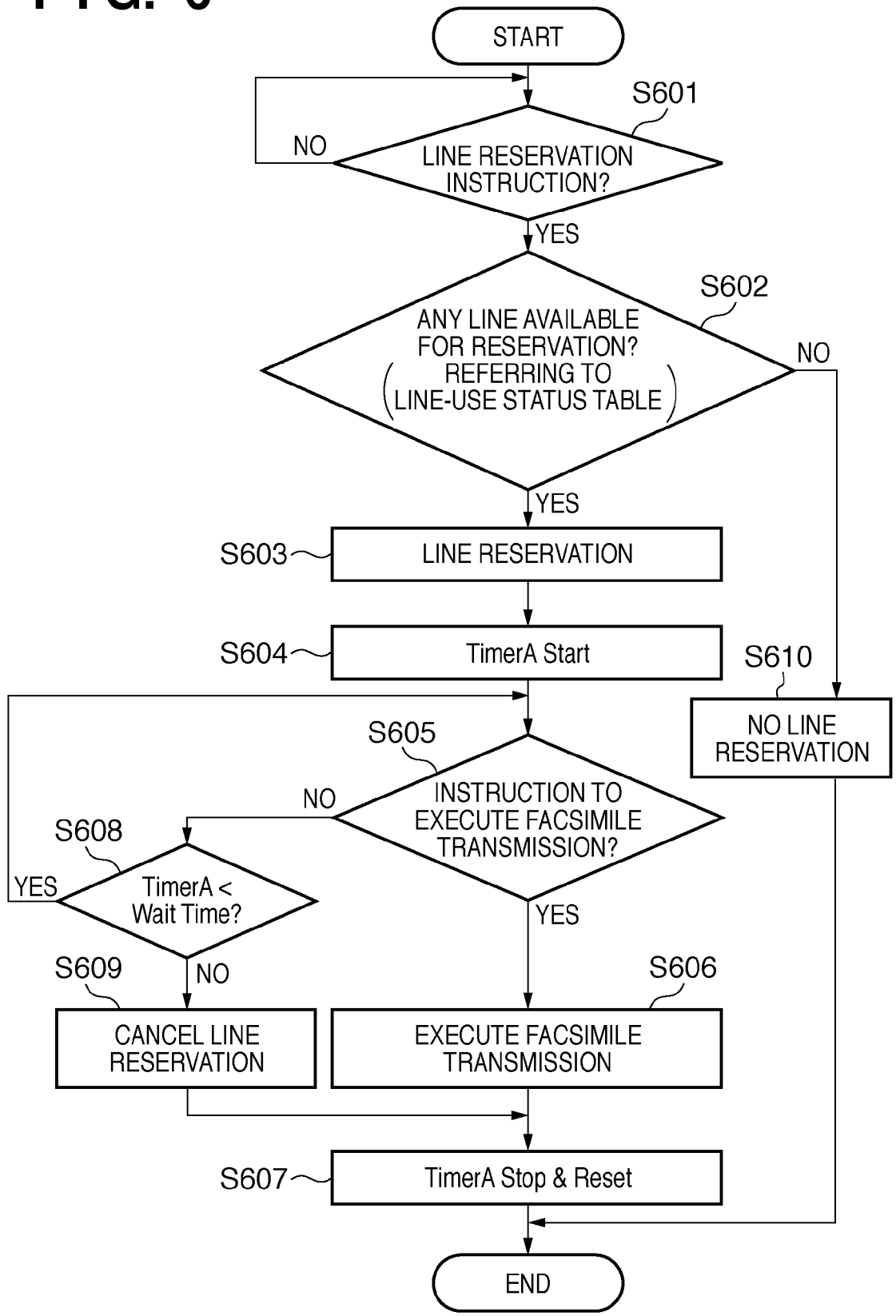
FIG. 6 is a flow chart showing a line-control procedure with a facsimile apparatus according to the first exemplary embodiment.

Next, a method for controlling line reservations in the facsimile system according to the present invention will be described with reference to FIG. 6. FIG. 6 is a flow chart illustrating a line-control procedure with the facsimile apparatus 107 according to the first exemplary embodiment. The processing described below is subject to centralized control by the CPU 9 of the facsimile apparatus 107.

Note that the following description explains by way of example a case where, upon receipt of a user's instruction from an external apparatus that is connected to the facsimile apparatus 107 over a network, the facsimile apparatus 107 converts the data received from the external apparatus into facsimile data and transmits the converted data. In the present example, any of the MFPs 104a to 104d, the server 102, the clients 103a and 103b, the LBP 105, and the scanners 106a and 106b, described above, can be an "external apparatus"; the following description explains the case where the MFP 104a is regarded as an "external apparatus".

First, in step S601, the CPU 9 determines whether an instruction to reserve a line has been issued from the MFP 104a connected over the network 101. Here, the "instruction to reserve a line" is different from a user's instruction to initiate the actual execution of facsimile transmission. The "instruction to reserve a line" as used herein is a notification indicating that an operator (user) has initiated a setting for execution of facsimile transmission. In other words, for example when an operation screen displayed on the operation panel 8 is switched to a screen for entering an instruction to execute facsimile transmission, this is notified to the CPU 9 and, according to this notification, a line is reserved before the issuance of a user's instruction to execute facsimile transmission. Note that, instead of being reserved depending on the switching of the operation screen as described above, a line may be reserved when direct transmission is selected as a transmission method for transmitting facsimile data on the screen for entering an instruction to execute facsimile transmission.

While the present example is for the case where a user operates an apparatus (MFP 104a) other than the facsimile apparatus 107, the present invention is also applicable to the case where a user directly operates the facsimile apparatus 107. In this case, the facsimile apparatus 107 makes the determination in step S601 according to a user's instruction that has been input with its own operation panel 8.

If there is no instruction to reserve a line in step S601, the determination in step S601 is repeatedly made until the instruction is received. On the other hand, if there is an instruction to reserve a line, the CPU 9 determines whether or not any line is available or open for facsimile transmission in step S602. Specifically, the CPU 9 refers to the line-use status table 15 to search for a line from among lines 2 to 4 that has "open" status. If no line has "open" status, the process goes to step S610 and the CPU 9 completes the process without reserving any line.

At this time, the CPU 9 also notifies the MFP 104a, which is the source of request for the line reservation, that there is no available line for facsimile transmission. Alternatively, if the request for the line reservation is based on a user's operation with the operation panel 8, such a notification may be made by displaying on the operation panel 8 that there is no available line for facsimile transmission.

On the other hand, if any line has "open" status, the process goes to step S603 where the CPU 9 makes a line reservation. At this time, the CPU 9 changes the use status of the reserved line on the line-use status table 15 during the reservation. The CPU 9 then initiates a timer in step S604. Here, the CPU 9 is one example of a timer unit that times an elapsed time since a line was reserved. Such a timer may be implemented by the software of the facsimile apparatus 107 or may be implemented using an additional clock IC.

Then, in step S605, the CPU 9 determines whether or not there is an instruction to execute facsimile transmission. If there is an instruction to execute facsimile transmission, the process goes to step S606 where a direct-current loop is formed with a switchboard on the previously reserved line in order to acquire that line and the transmission of facsimile data is initiated using the acquired line. Further in step S607, the timer is stopped and reset.

If it has been determined in step S605 that there is no instruction to execute facsimile transmission, the process goes to step S608 where the CPU 9 determines whether or not the present measured value (elapsed time) of the timer exceeds a predetermined period of time. The "predetermined period of time" as used herein refers to a time that can be specified by a user and during which a line reservation is possible. If the measured value of the timer has not exceeded the predetermined period of time, the CPU 9 returns the process to step S605.

On the other hand, if the measured value of the timer has exceeded the predetermined period of time, the process goes to step S609 where the CPU 9 cancels a line reservation. Thereafter, the process goes to step S607 where the CPU 9 stops and resets the timer.

As described above, the facsimile system 100 according to the present exemplary embodiment is capable of imposing a limitation that prevents a reserved line from being used by any other user or apparatus, before actually initiating the use of the line. In other words, the system allocates a line with priority at the stage when a user sets the settings for facsimile transmission, thus preventing the line from being used for other applications during setting.

Note that the present invention is not limited to the above exemplary embodiment, and various modifications are possible. For example, if all lines have already been used for other applications and no line is available for reservation at the time when a user tries to reserve a line, this maybe informed (notified) to the user. By doing so, before initiating an operation to set settings for facsimile transmission, a user can know that facsimile transmission cannot be executed soon.

Alternatively, the facsimile apparatus 107 according to the present exemplary embodiment may cancel a reservation for such a line that has been reserved for more than a certain period of time since the reservation. This prevents a reserved line from being left as-is and kept reserved more than necessary, thus improving the use efficiency of line sources in the facsimile system.

Second Exemplary Embodiment

Figure 7:
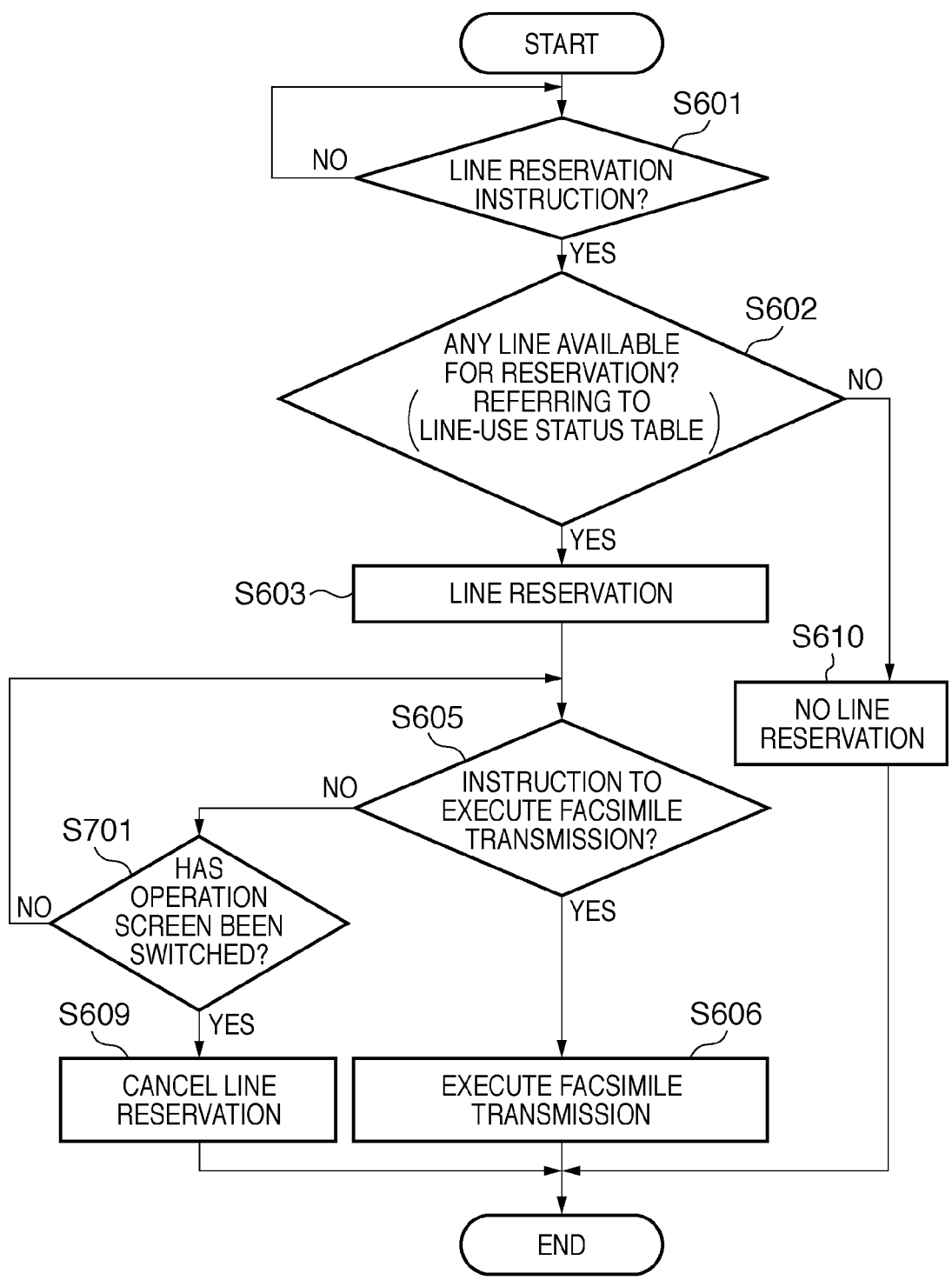
FIG. 7 is a flow chart showing a line-control procedure with a facsimile apparatus according to a second exemplary embodiment.

Next, a second exemplary embodiment will be described with reference to FIGS. 7 and 8. FIG. 7 is a flowchart illustrating a line-control procedure with a facsimile apparatus 107 according to the second exemplary embodiment. The processing described below is subject to centralized control by the CPU 9 of the facsimile apparatus 107. Note that the steps in the control procedure that are similar to those in the flow chart of FIG. 6 are denoted by the same step numbers and are not described herein. Therefore, only step S701 is described below.

Thus, steps S601 to S603, S605, S606, S609, and S610 in FIG. 7, which are similar to those in the control procedure described with reference to FIG. 6, are not described herein. In the flowchart of FIG. 7, the processing of steps S604 and S607 in FIG. 6 is omitted, and the determination in step S701 is made without using a timer.

Specifically, while FIG. 6 explains a first cancel method for cancelling a line reservation using a timer, FIG. 7 explains a second cancel method for cancelling a line reservation depending on the switching of an operation screen.

In step S701, the CPU 9 determines whether or not an operation screen, which will be described later, has been switched to another screen. If the operation screen has not been switched to another screen, the process returns to step S605 where the CPU 9 determines whether or not there is an instruction to execute facsimile transmission. On the other hand, if the operation screen has been switched to another screen, the process goes to step S609 where the CPU 9 determines that there is no instruction to execute facsimile transmission and completes the process by cancelling the line reservation.

As described above, according to the present exemplary embodiment, whether or not to cancel a line reservation is determined by the transition of the operation screen that is operated by a user, although such determination is made using a timer in the above-described exemplary embodiment. Now, the operation screen is described with reference to FIG. 8.

Figure 8:
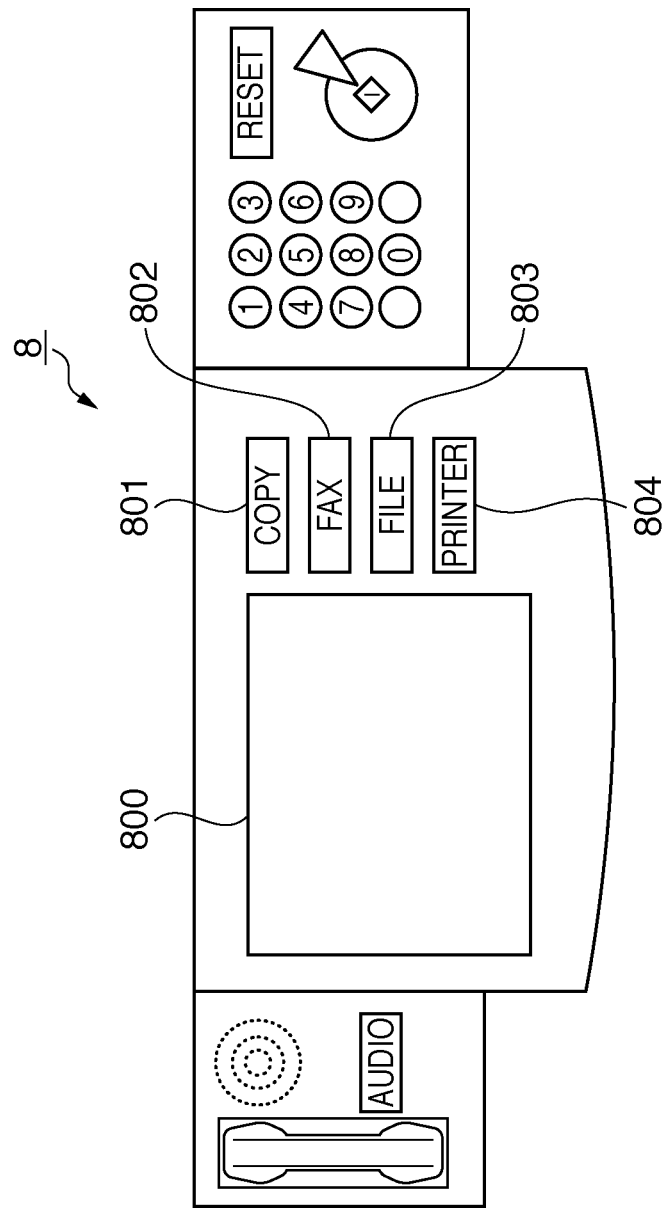
FIG. 8 illustrates an operation panel 8 of the facsimile apparatus according to the second exemplary embodiment.

FIG. 8 illustrates an operation panel of a facsimile apparatus according to the second exemplary embodiment. As illustrated in FIG. 8, the operation panel 8 includes an operation screen 800 and operation-screen switch buttons such as a copy button 801, a FAX button 802, a file button 803, and a printer button 804.

For the determination in step S701 in FIG. 7, if any of the copy button 801, the file button 803, and the printer button 804 was selected under the condition where the FAX button 802 has been selected, the CPU 9 determines that there will be no instruction to execute facsimile transmission. Although in the present example, the buttons 801 to 804 are provided as hardware keys, the operation screen may be switched using software keys displayed on the operation screen.

As described above, the facsimile system according to the present exemplary embodiment cancels a line reservation when the screen for entering an instruction to transmit facsimile data is switched to any other screen. This enables effective use of line sources with more efficiency.

Note that the present invention is not limited to the above exemplary embodiment and various modifications are possible. For example, an additional reserve button with which a line reservation is made may be provided on the operation screen. With such a configuration, the facsimile apparatus 107 makes a line reservation at the press of the reserve button. This enables the facsimile apparatus 107 to omit the process for determining whether or not a line reservation is necessary while monitoring the setting status of the operation screen (e.g., transition of the screen). In addition, since an operator can explicitly issue instructions for a line reservation, operability can be improved.

Third Exemplary Embodiment

Figure 9:
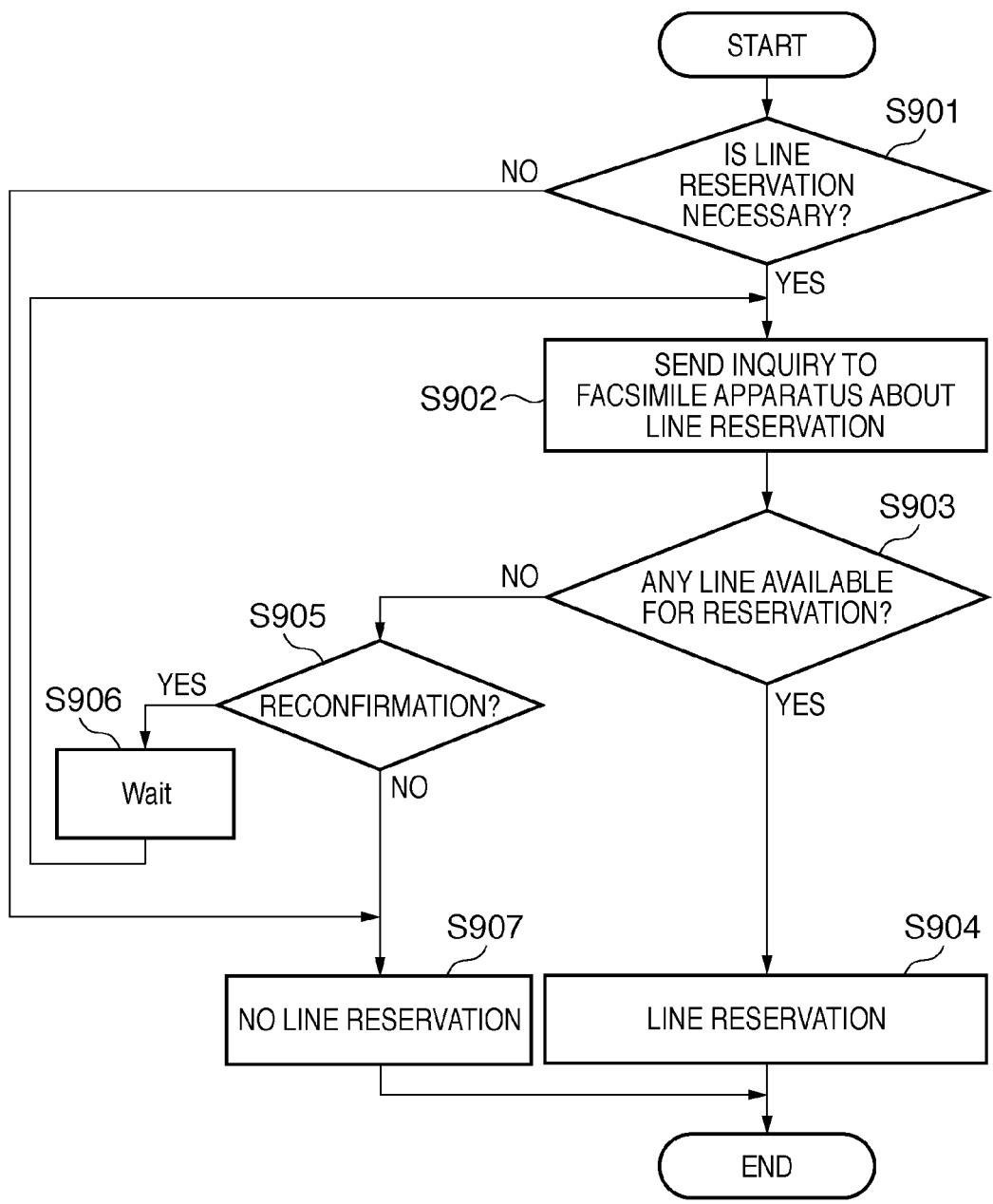
FIG. 9 is a flow chart showing a control procedure with an MFP according to a third exemplary embodiment.

Next, a third exemplary embodiment will be described with reference to FIG. 9. While the exemplary embodiments described above have explained the line-control procedure with the facsimile apparatus 107, the present exemplary embodiment describes control on the side of the MFP 104a. FIG. 9 illustrates a control procedure with the MFP 104a according to the third exemplary embodiment. The processing described below is subject to centralized control by the CPU of the MFP 104a.

In step S901, the CPU of the MFP 104a will determine that a line reservation is necessary when a user of the MFP 104a has initiated an operation for inputting the settings for facsimile transmission. Hereinafter, the CPU of the MFP 104a is referred to as a client CPU. In the present example, for example when the display of an operation screen for a user to enter an instruction to execute a printing process is switched to another operation screen for entering an instruction to execute facsimile transmission, a line reservation is determined as necessary. If a line reservation is not necessary, the process goes to step S907 where the client CPU completes the process without reserving any line.

On the other hand, if a line reservation is necessary, the process goes to step S902 where the client CPU notifies the facsimile apparatus 107 of whether or not a line reservation is possible. Upon receipt of this notification, the facsimile apparatus 107 checks whether or not a line reservation is possible by referring to the line-use status table 15 and sends a confirmatory result back to the client CPU.

Upon receipt of the confirmatory result from the facsimile apparatus 107, in step S903, the client CPU determines whether or not a line reservation is possible by referring to the information from the confirmatory result. If a line reservation is determined as possible, the process goes to step S904 where the client CPU sends a request for line reservation to the facsimile apparatus 107. Upon such a request, the facsimile apparatus 107 makes a line reservation as in the exemplary embodiments described.

On the other hand, if a line reservation has been determined as impossible in step S903, the process goes to step S905 where the client CPU determines whether or not reconfirmation is necessary. For example, the client CPU determines that reconfirmation is necessary if the user-defined processing was facsimile transmission and direct transmission has also been selected. If such reconfirmation has been determined as necessary, the process goes to step S906 where the client CPU waits until a predetermined period of time has elapsed and then returns the process to step S902. On the other hand, if reconfirmation has been determined to be unnecessary in step S905, the process goes to step S907 where the client CPU completes the process without reserving any line.

As described above, according to the present exemplary embodiment, a line-control procedure similar to those described in the first and second exemplary embodiments is performed in accordance with a user operation at the MFP 104a. Thus, the effects of the above-described exemplary embodiments can also be achieved when facsimile transmission is executed according to an instruction from an external apparatus that is connected to the facsimile apparatus over a network.

Fourth Exemplary Embodiment

Figure 10:
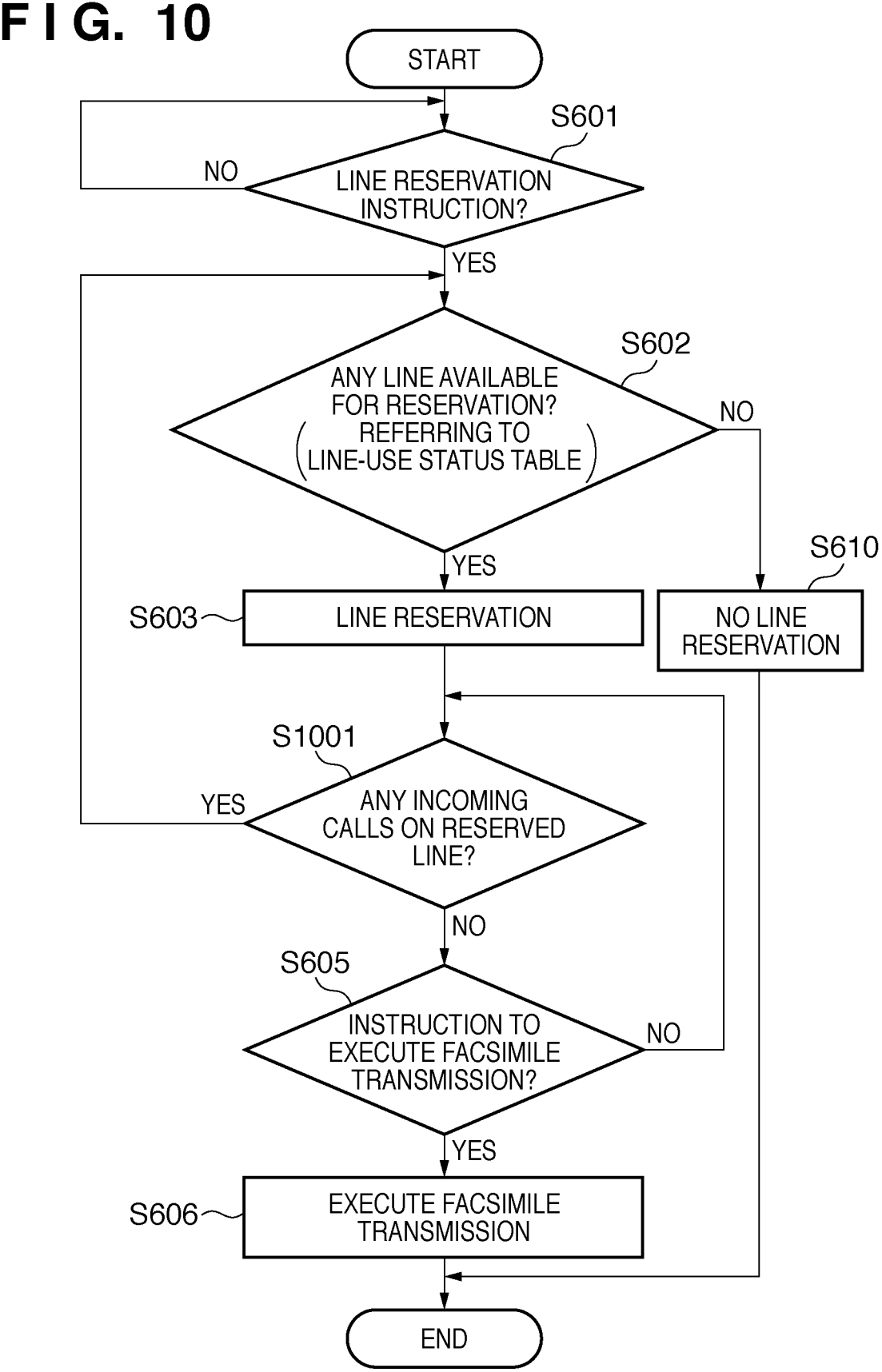
FIG. 10 is a flow chart showing a line-control procedure with a facsimile apparatus according to a fourth exemplary embodiment.

Next, a fourth exemplary embodiment will be described with reference to FIG. 10. The present exemplary embodiment explains a control procedure in the case where a line that has "reserved" status receives an incoming call. FIG. 10 is a flow chart illustrating a line-control procedure with facsimile apparatus 107 according to a fourth exemplary embodiment. The processing described below is subject to centralized control by the CPU 9 of the facsimile apparatus 107. Note that the steps in the control procedure that are similar to those in the flow chart of FIG. 6 are denoted by the same step numbers and are not described herein. That is, only step S1001 will be described below. Thus, steps S601 to S603, S605, S606, and S610 in FIG. 10, which are similar to those in the control procedure described with reference to FIG. 6, are not described herein.

When a line reservation has been made in step S603, in step S1001, the CPU 9 determines whether or not the reserved line has received an incoming call. If no incoming call has been received, the process goes to step S605 where the CPU 9 determines whether or not there is an instruction to execute facsimile transmission. Further, if there is no instruction to execute facsimile transmission, the process returns to the determination in step S1001.

On the other hand, if it is determined in step S1001 that an incoming call has been received, the process returns to refer to the line-use status table 15 in step S602. In this case, the line that has received an incoming call becomes "busy" because it is used for facsimile reception. If another line that is in the "open" state has been found by referring again to the line-use status table 15, a process for making a new reservation for that line is performed. If all the lines have been found to be occupied as a result of referring to the line-use status table 15 in step S602 (if there is no line that is in the "open" state), the process goes to step S610 where the process is completed without reserving any line. At this time, a notification that the reserved line could not be used and there remains no other line that is available for reservation may be given to a user.

As described above, in the facsimile system according to the present exemplary embodiment, when a reserved line receives an incoming call, another line is reserved if there is any other line that is available for reservation, whereas no reservation is made if there is no other line that is available for reservation. With this system, if there is any available line when a reserved line receives an incoming call, the reservation can automatically be switched to another line, so that the line reservation can be maintained. If there is no other available line, a notification that there is no other available line can be given to a user.

Other Exemplary Embodiments

Figure 11:
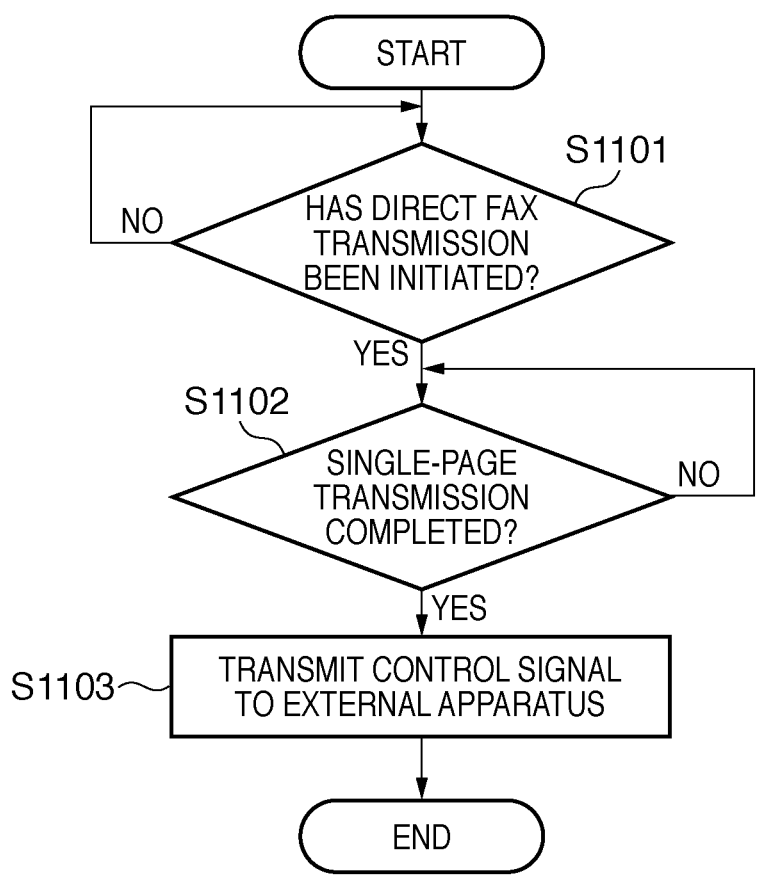
FIG. 11 is a flow chart showing a direct-transmission control procedure with an MFP according to another exemplary embodiment.

Next, other exemplary embodiments will be described with reference to FIGS. 11 to 16. First, a control procedure in which direct transmission with the facsimile apparatus 107 is requested by another apparatus (MFP 104a) that is connected to the facsimile apparatus 107 over a network will be described with reference to FIG. 11. FIG. 11 is a flow chart illustrating a direct-transmission control procedure with a facsimile apparatus according to another exemplary embodiment. The processing described below is subject to centralized control by the CPU 9 of the facsimile apparatus 107.

In step S1101, the CPU 9 determines whether or not direct facsimile transmission has been initiated. If transmission has not yet been initiated, the determination in step S1101 is repeated at regular time intervals. On the other hand, if transmission has been initiated, the process goes to step S1102 where the CPU 9 monitors the status of FAX transmission and determines whether or not a single page of an original has been transmitted. If a single page of an original has not yet been transmitted, the determination in step S1102 is repeated at regular time intervals until a single page of the original has been transmitted. On the other hand, if a single page of an original has been transmitted, the process goes to step S1103 where the CPU 9 transmits a control signal for reading the next original to the apparatus (MFP 104a) that is the source of the request for the direct FAX transmission.

Figure 12:
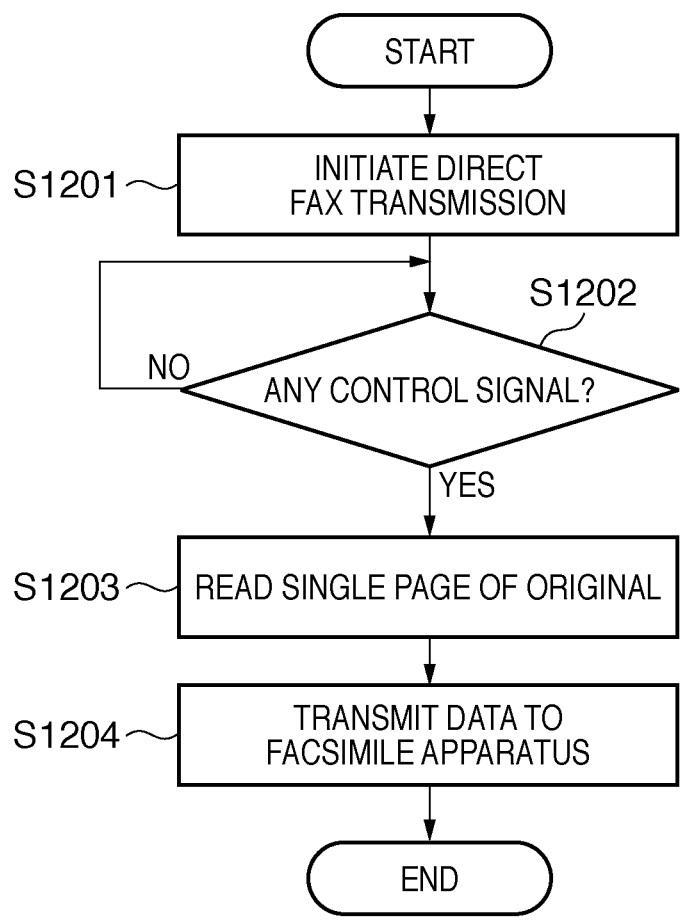
FIG. 12 is a flow chart showing a direct-transmission control procedure with an MFP according to another exemplary embodiment.

Next, a control procedure on the side of the MFP 104a will be described with reference to FIG. 12, which corresponds to the flow chart in FIG. 11. FIG. 12 is a flow chart illustrating a direct-transmission control procedure with the MFP 104a according to another exemplary embodiment.

In step S1201, the client CPU issues an instruction to initiate direct transmission on the side of the facsimile apparatus 107 according to a user's instruction. When the facsimile apparatus 107 has initiated direct transmission, in step S1202, the client CPU determines whether or not a control signal for direct transmission, described in step S1103, has been transmitted from the facsimile apparatus 107. If the control signal has not yet been transmitted, the determination in step S1202 is repeated at regular time intervals.

On the other hand, if the control signal has been transmitted, the process goes to step S1203 where the client CPU reads the next page of an original. Then in step S1204, the client CPU transmits the read image data to the facsimile apparatus 107.

As described above, in the case where direct FAX transmission is performed by an apparatus (MFP 104a) that is connected to the facsimile apparatus 107 over a network, continuous data may be transmitted depending on the transmission status of the facsimile data. This improves the efficiency of direct transmission.

Note that, while the determination in step S1102, that is, whether or not the transmission has been completed, is based on a single page of an original as a predetermined amount of transmitted data, the determination of whether or not the transmission has been completed may be made based on a half or quarter of an original in order to improve accuracy. Such a setting may preferably be set according to the performance of each piece of equipment or according to the specification of the system. Alternatively, such a setting may be selected by a system manager.

Figure 13:
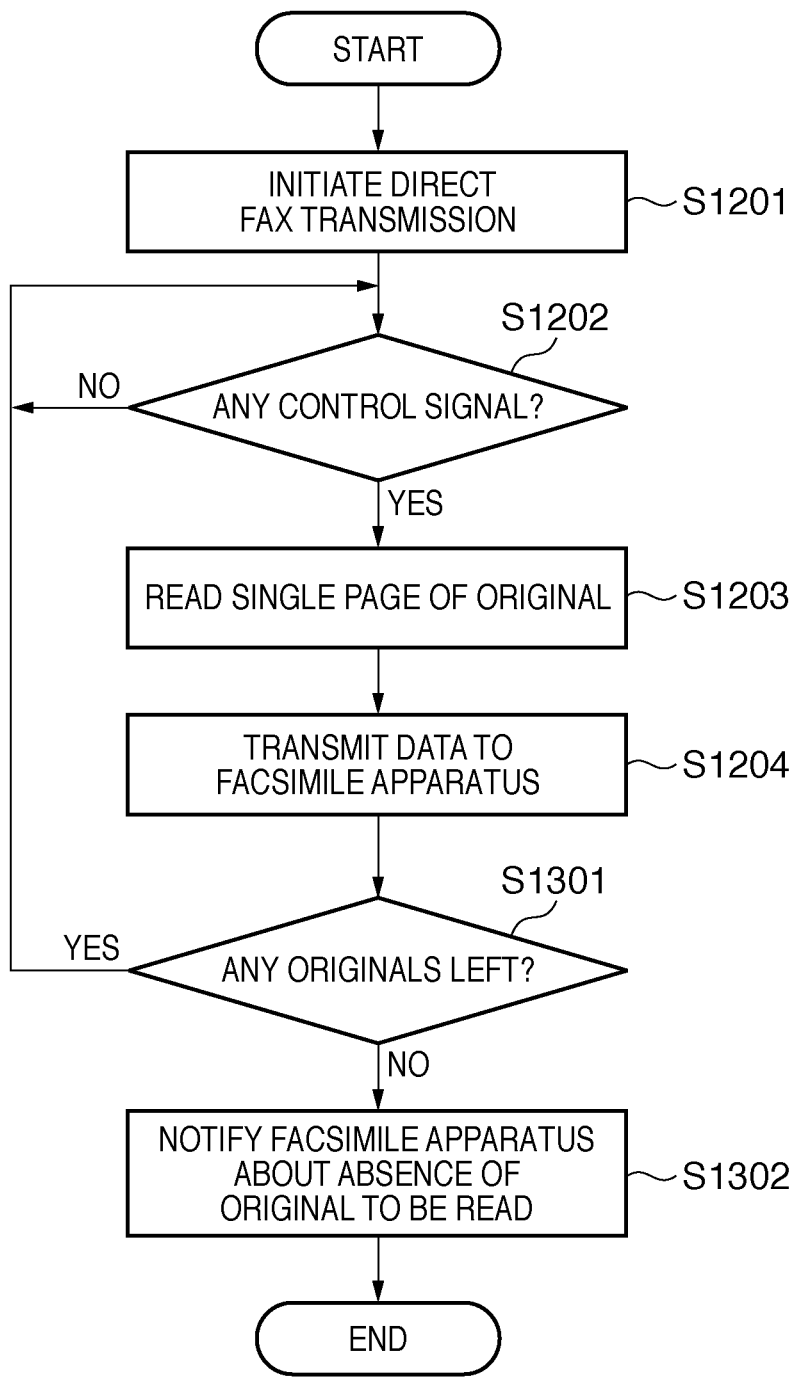
FIG. 13 is a flow chart showing a direct-transmission control procedure with an MFP according to another exemplary embodiment.

Next, a variation of the control procedure described with FIG. 12 will be described with reference to FIG. 13. FIG. 13 is a flow chart illustrating a direct-transmission control procedure with the MFP 104a according to another exemplary embodiment. Note that the steps that are similar to those in FIG. 12 are denoted by the same step numbers and are not described herein. That is, steps S1201 to S1204 are not described herein and only steps S1301 and S1302 will be described.

When a predetermined read operation has been completed, in step S1301, the client CPU determines whether or not an original remains. If an original remains, the process returns to step S1202 to wait for the transmission of the next control signal. On the other hand, if no original remains, the process goes to step S1302 where the client CPU notifies the facsimile apparatus 107 that there is no original to be transmitted.

In this procedure, the facsimile apparatus 107 can be notified of the presence or absence of a remaining original, which enables the facsimile apparatus 107 to determine the last page of transmitted data and to complete transmission processing.

Figure 14:
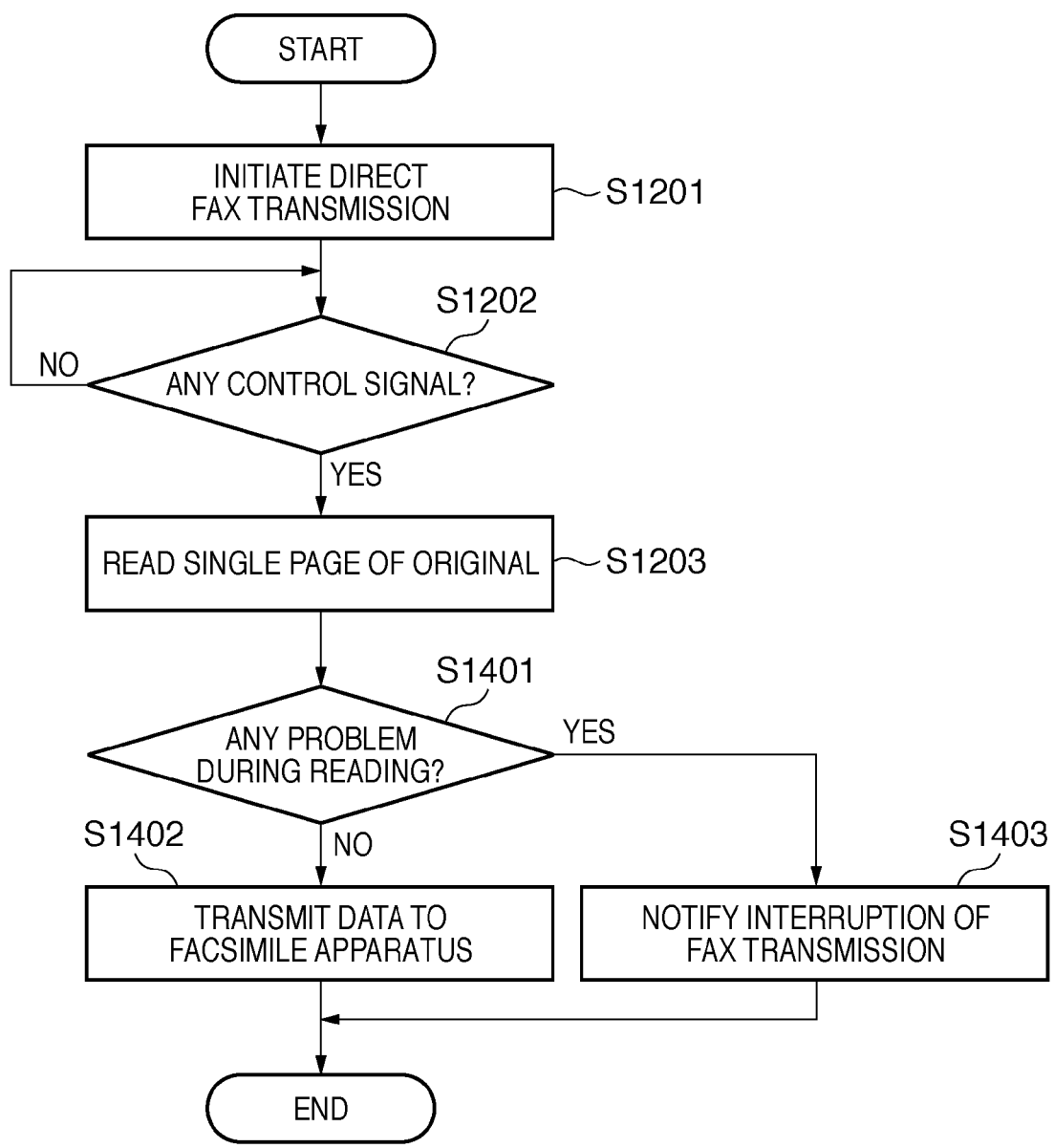
FIG. 14 is a flow chart showing a direct-transmission control procedure with an MFP according to another exemplary embodiment.

Next, another variation of the control procedure described with FIG. 12 will be described with reference to FIG. 14. FIG. 14 is a flow chart illustrating a direct-transmission control procedure with the MFP 104a according to another exemplary embodiment. Note that the steps that are similar to those in FIG. 12 are denoted by the same step numbers and are not described herein. That is, steps S1201 to S1203 are not described herein and only steps S1401 to S1403 will be described.

In step S1401, the client CPU determines whether or not any problem has occurred during the operation of reading an original. If no problem has occurred, then the process goes to step S1402 where the client CPU transmits image data to the facsimile apparatus 107. If any problem has occurred, then the process goes to step S1403 where the client CPU notifies the facsimile apparatus 107 of a request to interrupt facsimile transmission.

As one example, with a scanner of the MFP 104a or the like, image reading may end in failure due to a paper jam while reading an original, for example. In such a case, if a signal for interrupting facsimile transmission is transmitted to the facsimile apparatus 107, the facsimile apparatus 107 can interrupt facsimile communications. This enables speedy error handling and, as a result, early release of line resources. Note that while the present example explains the case where the MFP 104a transmits a signal for interrupting facsimile transmission, the procedure may be such that the MFP 104a notifies the facsimile apparatus 107 about only the fact that a problem has occurred in reading an original and then the facsimile apparatus 107 correspondingly interrupts facsimile transmission.

Figure 15:
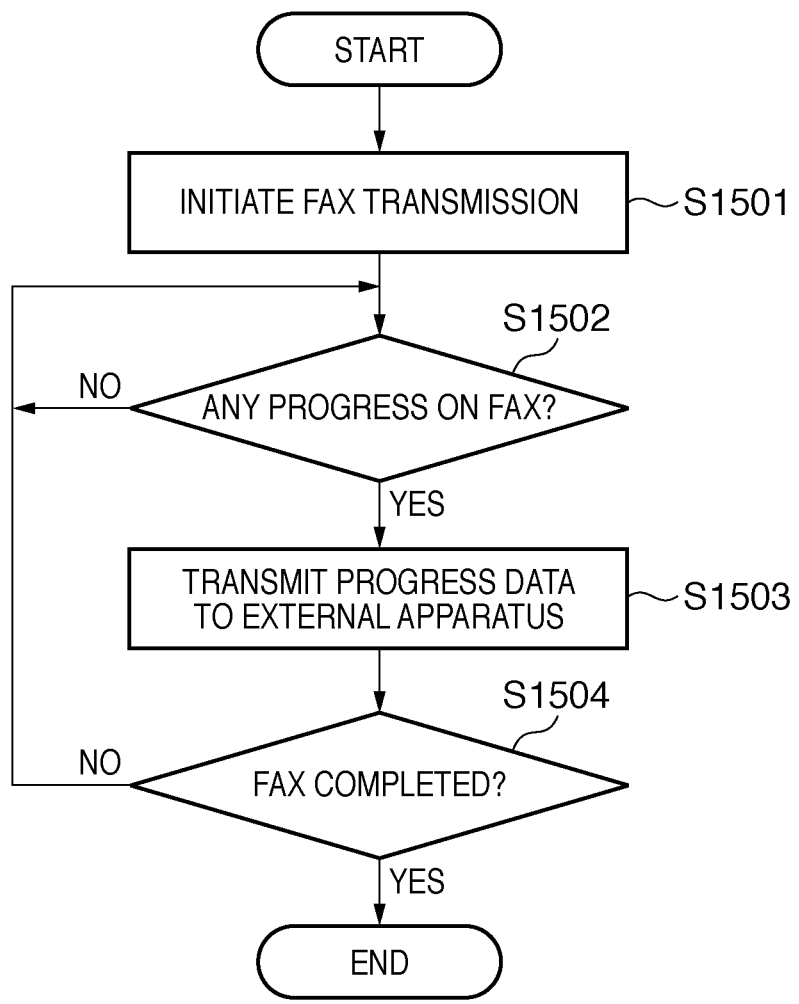
FIG. 15 is a flow chart showing a facsimile-transmission control procedure with a facsimile apparatus according to another exemplary embodiment.

Next, a control procedure for notifying the MFP 104a about the progress of facsimile transmission in the facsimile apparatus 107 will be described with reference to FIG. 15. FIG. 15 is a flow chart illustrating a facsimile-transmission control procedure with the facsimile apparatus 107 according to another exemplary embodiment. The processing described below is subject to centralized control by the CPU 9 of the facsimile apparatus 107.

In step S1501, the CPU 9 initiates facsimile transmission. Upon the initiation of facsimile transmission, in step S1502, the CPU 9 determines whether or not a predetermined amount of progress has been made on the FAX transmission. Such determination may, for example, be whether or not a single page of an original has been transmitted, or may be whether or not a half or a quarter of an original has been transmitted in order to check the status of the transmission in more detail.

If the predetermined progress has not yet been made, the determination in step S1502 is repeated at regular time intervals. On the other hand, if the predetermined progress has been made, then in step S1503, the CPU 9 transmits progress data that indicates the progress made to an apparatus that requested the FAX transmission. Thereafter, in step S1504, the CPU 9 determines whether or not the progress data represents completion of the FAX. If the progress data represents completion, the process is completed as-is. If the progress data does not represent completion, the process goes to step S1502 where the next progress check is made.

As described above, the facsimile apparatus 107 according to the present invention may notify an apparatus that requested the execution of facsimile transmission about the progress of the facsimile transmission. This enables the source of the request to be notified of the progress of facsimile transmission and to thereby achieve efficient reading control at the source of the request.

Figure 16:
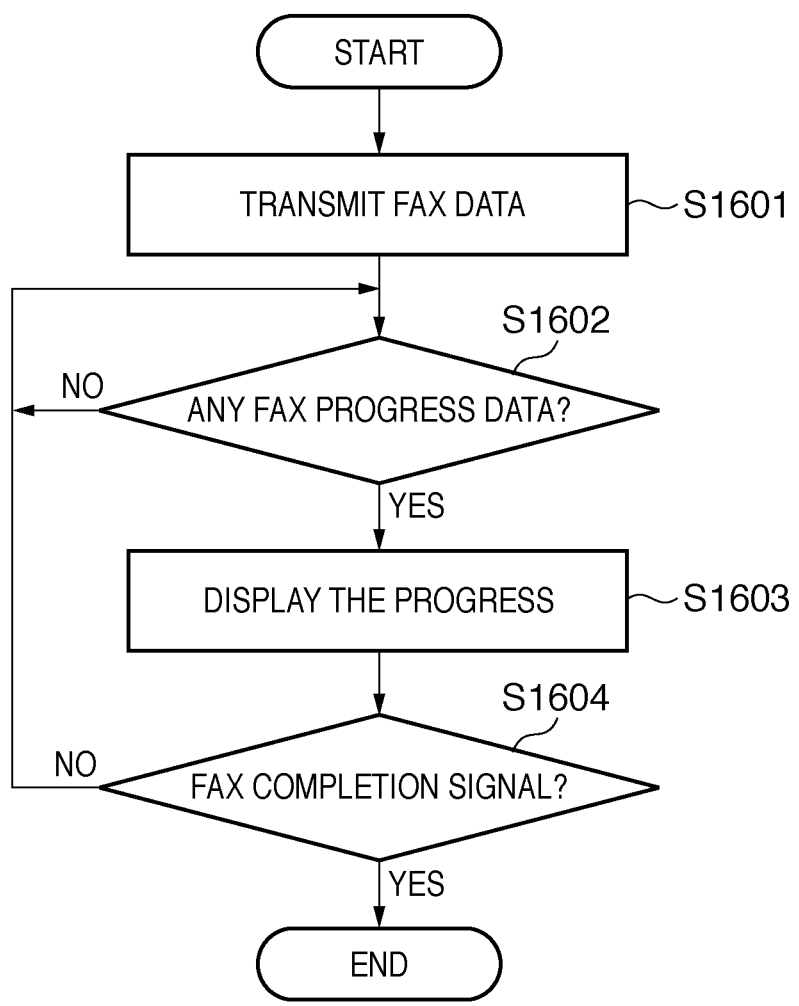
FIG. 16 is a flow chart showing a facsimile-transmission control procedure with an MFP according to another exemplary embodiment.

Next, a control procedure on the side of the MFP 104a will be described with reference to FIG. 16, which corresponds to the flowchart of FIG. 15. FIG. 16 is a flow chart illustrating a facsimile-transmission control procedure with the MFP 104a according to another exemplary embodiment.

In step S1601, the client CPU initiates data transmission to the facsimile apparatus 107. Then, in step S1602, the client CPU determines whether or not progress data about the progress of facsimile transmission has been transmitted from the facsimile apparatus 107. If the progress data has not yet been transmitted, the determination in step S1602 is repeated at regular time intervals.

On the other hand, if the progress data has been transmitted, then in step S1603, the client CPU displays the progress on its own display unit. Thereafter, the client CPU determines whether or not the progress indicates the completion of facsimile transmission instep S1604. If the progress represents completion, the process is completed as-is. On the other hand, if the progress does not represent completion, the process returns again to the determination in step S1602.

As described above, the facsimile system according to the present exemplary embodiment enables an apparatus that is a source of a request for facsimile transmission to check the progress of a facsimile transmission. In addition, the above-described progress data enables efficient control over the operation of reading an original.

While the exemplary embodiments have been described in detail above, the present invention can be embodied as a system, an apparatus, a method, a program, or a storage medium (recording medium), for example. Specifically, the present invention may be applied to a system constituted by a plurality of devices or to an apparatus composed of a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-244939 filed on Sep. 24, 2008, which is hereby incorporated by reference herein in its entirety.

What is claimed is:

1. A facsimile apparatus that executes facsimile communications over a line, comprising: a reservation unit that reserves a line to be used for facsimile transmission before execution of the facsimile transmission; and a transmission unit that, after the reservation unit has reserved a line, acquires the reserved line upon a user's instruction to execute the facsimile transmission, and transmits facsimile data using the acquired line, wherein the reservation unit reserves the line when direct transmission is selected as a transmission method for transmitting the facsimile data; an operation unit for inputting an instruction into the facsimile apparatus; wherein the reservation unit reserves a line when an operation screen displayed in the operation unit is switched to a screen for entering an instruction to execute the facsimile transmission.

2. The facsimile apparatus according to claim 1, the facsimile apparatus being connectable to a plurality of lines and further comprising:
a storage unit that stores information indicating which state of busy, reserved, or open each of the plurality of lines is in;
wherein the reservation unit reserves a line from among the plurality of lines that is in the open state by referring to the information stored in the storage unit.

3. The facsimile apparatus according to claim 2, further comprising:
a informing unit that informs a user of information that no line is available for reservation, when the reservation unit has found no line from among the plurality of lines that is in the open state as a result of referring to the information stored in the storage unit.

4. The facsimile apparatus according to claim 1, further comprising:
a timer unit that times an elapsed time after the reservation unit reserved a line; and
a first cancellation unit that cancels a line reservation made by the reservation unit, when a result of timing with the timer unit shows that the elapsed time from when the reservation unit reserves a line and until the issuance of the instruction to execute the facsimile transmission exceeds a predetermined period of time.

5. The facsimile apparatus according to claim 4, further comprising a second cancellation unit that cancels a line reservation made by the reservation unit when the operation screen displayed in the operation unit is switched from the screen for entering an instruction to transmit facsimile data to another screen after the reservation unit reserves a line.

6. The facsimile apparatus according to claim 1, further comprising:
an instruction unit that enables a user to issue an instruction to reserve a line with the reservation unit;
wherein the reservation unit reserves a line in the case where the instruction unit issues an instruction to reserve a line.

7. The facsimile apparatus according to claim 1, wherein, after a line reservation by the reservation unit and if a line reserved by the reservation unit receives an incoming call, the reservation unit newly reserves another line different from the line that was reserved by the reservation unit, as a line to be used for the facsimile transmission.

8. The facsimile apparatus according to claim 1,
the facsimile apparatus being connected to an external apparatus over a network that is different from the line,
wherein the transmission unit converts data received from the external apparatus into facsimile data and transmits the facsimile data in accordance with a user's instruction from the external apparatus.

9. The facsimile apparatus according to claim 8, wherein
the reservation unit reserves a line in accordance with a user operation at the external apparatus; and
the transmission unit acquires the reserved line upon receipt of the user's instruction to execute facsimile transmission from the external apparatus and initiates facsimile data transmission using the acquired line.

10. The facsimile apparatus according to claim 8, further comprising a notification unit that notifies the external apparatus of the progress of facsimile data transmission by the transmission unit.

11. The facsimile apparatus according to claim 8, wherein the transmission unit completes transmission processing upon receipt of a signal that indicates the completion of data transmission by facsimile from the external apparatus.

12. The facsimile apparatus according to claim 8, wherein the transmission unit interrupts transmission processing upon receipt of a signal that indicates the occurrence of an error in reading an original from the external apparatus.

13. A method for controlling a facsimile apparatus that executes facsimile communications over a line, comprising: reserving a line to be used for facsimile transmission before execution of the facsimile transmission; and after reserving the line, acquiring the reserved line upon receipt of a user's instruction to execute facsimile transmission and transmitting facsimile data using the acquired line, wherein the reservation of the line is performed when direct transmission is selected as a transmission method for transmitting the facsimile data; an operation unit for inputting an instruction into the facsimile apparatus; wherein the reservation unit reserves a line when an operation screen displayed in the operation unit is switched to a screen for entering an instruction to execute the facsimile transmission.

14. A non-transitory computer-readable storage medium storing a program that causes a computer to execute the method for controlling a facsimile apparatus according to claim 13.

* * * * *